United States Patent
Mailhot

(10) Patent No.: US 9,992,162 B2
(45) Date of Patent: Jun. 5, 2018

(54) DEVICE, SYSTEM AND METHOD FOR NETWORK-BASED ADDRESS TRANSLATION FOR MULTIPLE RECIPIENTS

(71) Applicant: IMAGINE COMMUNICATIONS CORP., North York (CA)

(72) Inventor: John Norman Mailhot, Bridgewater, NJ (US)

(73) Assignee: IMAGINE COMMUNICATIONS CORP., North York (CA)

( * ) Notice: Subject to any disclaimer, the term of this patent is extended or adjusted under 35 U.S.C. 154(b) by 124 days.

(21) Appl. No.: 15/061,431

(22) Filed: Mar. 4, 2016

(65) Prior Publication Data

US 2017/0257343 A1    Sep. 7, 2017

(51) Int. Cl.
*H04L 29/12* (2006.01)
*H04L 12/741* (2013.01)
*H04L 29/06* (2006.01)

(52) U.S. Cl.
CPC .......... *H04L 61/2575* (2013.01); *H04L 45/74* (2013.01); *H04L 65/4076* (2013.01)

(58) Field of Classification Search
CPC .. H04L 45/74; H04L 61/2575; H04L 65/4076
See application file for complete search history.

(56) References Cited

U.S. PATENT DOCUMENTS 6,181,697 B1    1/2001  Nurenberg et al.
6,567,851 B1    5/2003  Kobayashi
(Continued)

FOREIGN PATENT DOCUMENTS

EP    1914931 A2    4/2008

OTHER PUBLICATIONS

EPO, Extended European Search Report for EP Application No. 17159122.5 dated Jun. 19, 2017.

*Primary Examiner* — Benjamin H Elliott, IV
(74) *Attorney, Agent, or Firm* — Norton Rose Fulbright Canada LLP

(57) ABSTRACT

A network system, switch controller for multicast packet distribution by controlling a network switch having at least one ingress interface and at least one egress interface. The controller generates a control command using an application programming interface for the network switch, the control command having a replicate command to replicate the incoming signal packets by distributing the incoming signal packets based on a number of the plurality of destination addresses to a corresponding number of egress interfaces of the at least one egress interface of the network switch, each of the number of egress interfaces having a loopback connection to an ingress interface of the at least one ingress interface of the network switch, the control command having a header translation command to control the network switch to translate header address information of each of the replicated signal packets to a destination address of the plurality of destination addresses, the destination address for transmission of the translated replicated signal packets to a destination device listening to the destination address. The controller sends the control command to the network switch to trigger the distribution of the incoming signal packets to the plurality of destination addresses.

24 Claims, 5 Drawing Sheets

(56) References Cited

U.S. PATENT DOCUMENTS

| | | | |
|---|---|---|---|
| 6,831,917 B1 | 12/2004 | Cheriton | |
| 8,976,791 B1* | 3/2015 | Sivan | H04L 12/4625 |
| | | | 370/392 |
| 2008/0095093 A1* | 4/2008 | Oogushi | H04L 12/185 |
| | | | 370/312 |
| 2009/0161674 A1 | 6/2009 | Bou-Diab et al. | |
| 2011/0228767 A1* | 9/2011 | Singla | H04L 49/00 |
| | | | 370/389 |
| 2013/0195111 A1* | 8/2013 | Allan | H04L 12/462 |
| | | | 370/395.53 |
| 2015/0078377 A1* | 3/2015 | Wijnands | H04L 12/1886 |
| | | | 370/390 |
| 2016/0315701 A1* | 10/2016 | Yuki | H04J 14/0221 |
| 2017/0257343 A1* | 9/2017 | Mailhot | H04L 61/2575 |

\* cited by examiner

DEVICE, SYSTEM AND METHOD FOR NETWORK-BASED ADDRESS TRANSLATION FOR MULTIPLE RECIPIENTS

FIELD

The embodiments disclosed herein generally relate to the field of network routing, and in particular, to network-based address translation for multiple recipients.

INTRODUCTION

Network switches, hubs, bridges, routers, and other components connect devices together on a computer network and use packet switching to receive, process and forward data to destination devices. A network switch receives input data via one or more ingress interface ports and routes data packets out one or more egress interface ports to forward data packets to destination devices. An example network switch is an Ethernet switch.

In computer networking, a multicast is group communication where information is addressed to a group of destination computers simultaneously. A multicast may involve a one-to-many or many-to-many distribution.

SUMMARY

In accordance with one aspect, there is provided a process for packet distribution by controlling a network switch having at least one ingress interface and at least one egress interface. The process involving identifying a plurality of destination addresses for translating incoming signal packets received at an ingress interface of the at least one ingress interface of the network switch; generating a control command using an application programming interface for the network switch for distribution of the incoming signal packets to the plurality of destination addresses, the control command having a replicate command to replicate the incoming signal packets by distributing the incoming signal packets based on a number of the plurality of destination addresses to a corresponding number of egress interfaces of the at least one egress interface of the network switch, each of the number of egress interfaces having a forwarding path and a loopback connection to an ingress interface of the at least one ingress interface of the network switch, the control command having a header translation command to control the network switch to translate header address information of each of the replicated signal packets to a destination address of the plurality of destination addresses, the destination address for transmission of the translated replicated signal packets to a destination device listening to the destination address; and sending the control command to the network switch over the core network to trigger the distribution of the incoming signal packets to the plurality of destination addresses.

In some embodiments, the process involves generating the control command having an intermediate translation command to control the network switch to translate the header address information of the incoming signal packets to an intermediate address prior to the replicate command distributing the incoming signal packets.

In some embodiments, the process involves identifying the plurality of destination addresses for translating the incoming signal packets by checking the incoming signal packets for specific header address information.

In some embodiments, the specific header address information comprises Ethernet or Internet Protocol (IP) header fields such as source or destination addresses or User Datagram Protocol (UDP) source or destination port numbers.

In some embodiments, the process involves replicating the incoming signal packets by distributing the incoming signal packets based on a number of the plurality of destination addresses to a corresponding number of egress interfaces of the at least one egress interface of the network switch; receiving the replicated incoming signal packets from the loopback connections at the corresponding ingress interfaces of the network switch; and for each of the replicated signal packets, translating the header address information of the respective replicated signal packet to a destination address of the plurality of destination addresses, and transmitting the translated replicated signal packet to the destination address, the destination device listening to the destination address.

In accordance with one aspect, there is provided a process for packet distribution by controlling a network switch having at least one two interfaces. The process involving identifying a plurality of destination addresses for translating incoming signal packets received at an interface of the network switch; generating a control command using an application programming interface for the network switch for distribution of the incoming signal packets to the plurality of destination addresses, the control command having a replicate command to replicate the incoming signal packets by distributing the incoming signal packets based on a number of the plurality of destination addresses to one or more interfaces of the network switch, each of the interfaces having a forwarding path and a loopback connection to an interface of the network switch, the control command having a header translation command to control the network switch to translate header address information of each of the replicated signal packets to a destination address of the plurality of destination addresses, the destination address for transmission of the translated replicated signal packets to a destination device listening to the destination address; and sending the control command to the network switch over the core network to trigger the distribution of the incoming signal packets to the plurality of destination addresses.

In some embodiments, the process involves generating the control command having an intermediate translation command to control the network switch to translate the header address information of the incoming signal packets to an intermediate address prior to the replicate command distributing the incoming signal packets.

In some embodiments, the process involves identifying the plurality of destination addresses for translating the incoming signal packets by checking the incoming signal packets for specific header address information.

In some embodiments, the specific header address information comprises Ethernet or IP header fields such as source or destination addresses or UDP source or destination port numbers.

In some embodiments, the process involves replicating the incoming signal packets by distributing the incoming signal packets based on a number of the plurality of destination addresses to a corresponding number of interfaces of the network switch; receiving the replicated incoming signal packets from the loopback connections at the corresponding interfaces of the network switch; and for each of the replicated signal packets, translating the header address information of the respective replicated signal packet to a destination address of the plurality of destination addresses, and transmitting the translated replicated signal packet to the destination address, the destination device listening to the destination address.

In another aspect, there is provided a computer network system for multicast packet distribution having: a network switch having at least one ingress interface, at least one egress interface, and a switching fabric, at least one of the at least one egress interface having a loopback connection to at least one of the at least one ingress interface to the switching fabric; and a network controller connected to the network switch via a core network, the network controller configured to send a control command using an application programming interface for the network switch, the control command having a replicate command to replicate the incoming signal packets by distributing the incoming signal packets based on a number of a plurality of destination addresses to a corresponding number of egress interfaces of the at least one egress interface of the network switch, each of the number of egress interfaces having a loopback connection to an ingress interface of the at least one ingress interface of the network switch, the control command having a header translation command to control the network switch to translate header address information of each of the replicated signal packets to a destination address of the plurality of destination addresses, the destination address for transmission of the translated replicated signal packets to a destination device listening to the destination address; in response to receiving the control command, the network switch replicates the incoming signal packets by distributing the incoming signal packets based on the number of the plurality of destination addresses to the corresponding number of egress interfaces of the at least one egress interface, receives the replicated incoming signal packets from the loopback connections at the corresponding ingress interfaces, and for each of the replicated signal packets, translates the header address information of the respective replicated signal packet to the destination address of the plurality of destination addresses, and transmits the translated replicated signal packet to the destination address, the destination device listening to the destination address.

In some embodiments, a destination address of the plurality of destination addresses corresponds to a multicast group address.

In some embodiments, a destination address of the plurality of destination addresses corresponds to a unicast address.

In some embodiments, a destination address of the plurality of destination addresses corresponds to an IP address associated with the destination device.

In some embodiments, the network controller sends the control command having an intermediate translation command to control the network switch to translate the header address information of the incoming signal packets to an intermediate address, and in response to receiving the control command and prior to the distributing the incoming signal packets, the network switch translates the header address information to the intermediate address, and for each of the replicated signal packets, translates the intermediate address of the respective replicated signal packet to the destination address.

In some embodiments, at least one of the loopback connections is implemented by internal loop back functionality as part of a configuration interface that may force traffic back into the network switch in an operational setting.

In some embodiments, at least one of the loopback connections is implemented by an optical receiver and a fiber connection.

In some embodiments, at least one of the loopback connections is implemented by a physical electrical loopback cables that connects a transmit connector pins to receive connector pins, the transmit connector pins forming part of the at least one egress interface, and the receive connector pins forming part of the at least one ingress interface.

In some embodiments, at least one of the loopback connections is implemented by a pair of interfaces, of the at least one egress interface and the at least one ingress interface, the pair of interfaces having a first interface and a second interface, the first interface being connected to the second interface using an electrical or optical connection, where packets that egress on the first interface then ingress on the second interface and packets that egress on the second interface then ingress on the first interface.

In some embodiments, the network switch translates the header address information of the respective replicated signal packet to the destination address by substitution of a destination IP address in a IP header with the destination address.

In some embodiments, the network switch translates the header address information of the respective replicated signal packet to the destination address by substitution of a destination Media Access Control (MAC) address in an Ethernet header with a unicast or multicast MAC address that corresponds to the destination address or next hop gateway to the destination address.

In some embodiments, after translation, the network switch specifies a final destination interface corresponding to the destination device.

In another aspect, there is provided a network controller for multicast packet distribution by controlling a network switch having at least one ingress interface and at least one egress interface. The controller having: a data storage device storing a plurality of destination addresses; a processor to generate a control command using an application programming interface for the network switch, the control command having a replicate command to replicate the incoming signal packets by distributing the incoming signal packets based on a number of the plurality of destination addresses to a corresponding number of egress interfaces of the at least one egress interface of the network switch, each of the number of egress interfaces having a loopback connection to an ingress interface of the at least one ingress interface of the network switch, the control command having a header translation command to control the network switch to translate header address information of each of the replicated signal packets to a destination address of the plurality of destination addresses, the destination address for transmission of the translated replicated signal packets to a destination device listening to the destination address; and a transceiver to receive the plurality of destination addresses and send the control command to the network switch to trigger the distribution of the incoming signal packets to the plurality of destination addresses.

In some embodiments, the command has an intermediate translation command to control the network switch to translate the header address information of the incoming signal packets to an intermediate address prior to the replicate command distributing the incoming signal packets.

In another aspect, there is provided a computer network switch comprising: at least one ingress interface for receiving incoming signal packets, each packet having a header field; at least one egress interface; a switching fabric with at least one of the at least one egress interface having a loopback connection to at least one of the at least one ingress interface; wherein in response to receiving a control command generated using an application programming interface for the network switch, the control command having a replicate command to replicate the incoming signal packets by distributing the incoming signal packets based on a number of a plurality of destination addresses to a corresponding number of egress interfaces of the at least one egress interface of the network switch, each of the number of egress interfaces having a loopback connection to an ingress interface of the at least one ingress interface of the network switch, the control command having a header translation command to control the network switch to translate header address information of each of the replicated signal packets to a destination address of the plurality of destination addresses, the destination address for transmission of the translated replicated signal packets to a destination device listening to the destination address, the network switch replicates the incoming signal packets by distributing the incoming signal packets based on the number of the plurality of destination addresses to the corresponding number of egress interfaces of the at least one egress interface, receives the replicated incoming signal packets from the loopback connections at the corresponding ingress interfaces, and for each of the replicated signal packets, translates the header address information of the respective replicated signal packet to the destination address of the plurality of destination addresses, and transmits the translated replicated signal packet to the destination address, the destination device listening to the destination address.

In some embodiments, at least one of the loopback connections is implemented by internal loop back functionality as part of a configuration interface that may force traffic back into the network switch in an operational setting.

In some embodiments, at least one of the loopback connections is implemented by an optical receiver and a fiber connection.

In some embodiments, at least one of the loopback connections is implemented by a physical electrical loopback cables that connects a transmit connector pins to receive connector pins, the transmit connector pins forming part of the at least one egress interface, and the receive connector pins forming part of the at least one ingress interface.

In some embodiments, at least one of the loopback connections is implemented by a pair of interfaces, of the at least one egress interface and the at least one ingress interface, the pair of interfaces having a first interface and a second interface, the first interface being connected to the second interface using an electrical or optical connection, where packets that egress on the first interface then ingress on the second interface and packets that egress on the second interface then ingress on the first interface.

Many further features and combinations thereof concerning embodiments described herein will appear to those skilled in the art following a reading of the instant disclosure.

DESCRIPTION OF THE FIGURES

In the Figures.

DETAILED DESCRIPTION

Figure 1:
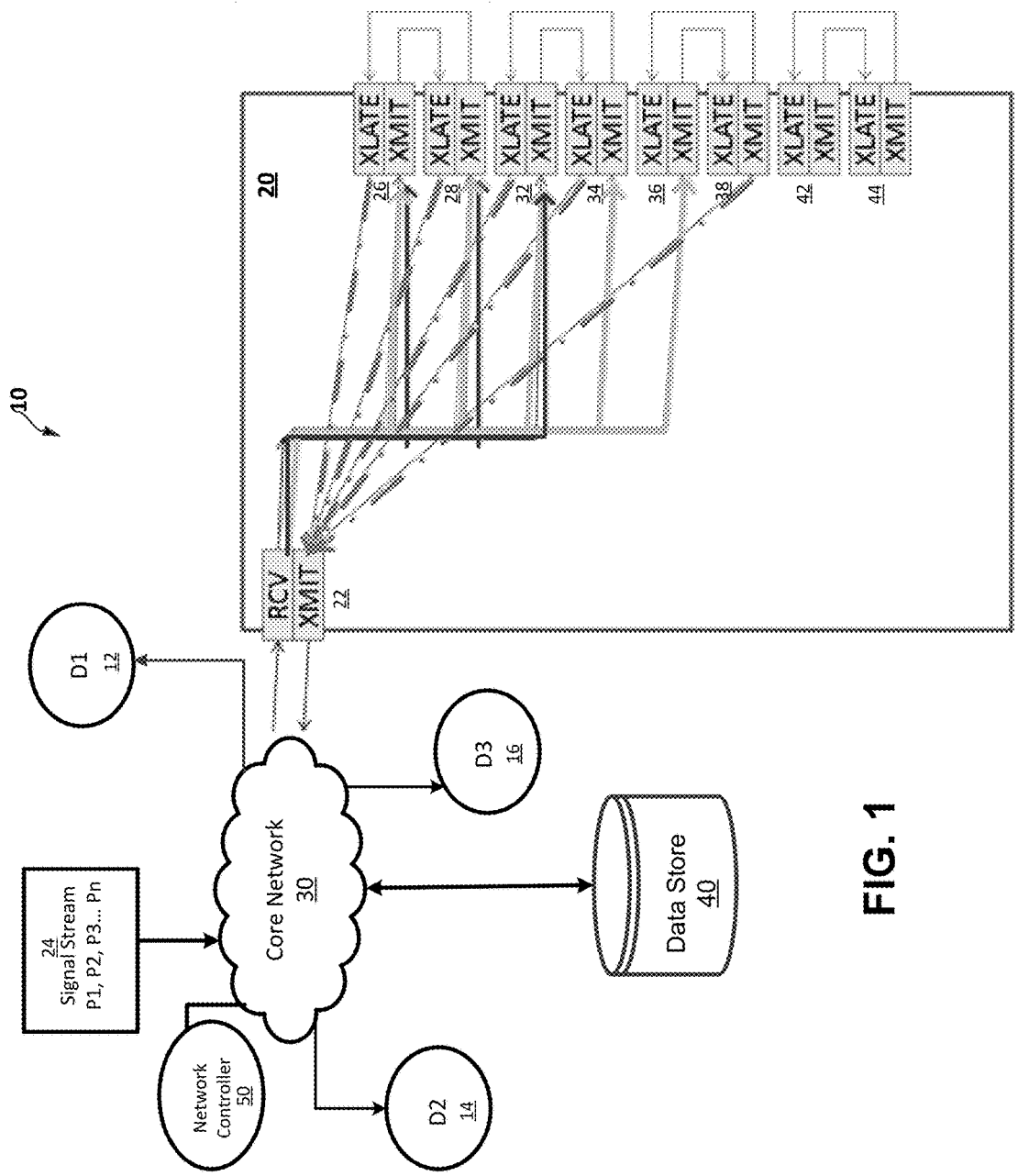
FIG. 1 shows a schematic diagram of an example network architecture for address translation according to some embodiments.

Internet Protocol (IP) multicast is a technique for one-to-many communication over an IP infrastructure in a network. Video-over-IP makes use of multicast packet distribution in order to distribute the same signal (e.g. data packets) to multiple destination devices within a network. The canonical method requires the destination device to "join" the multicast group it wishes to receive, typically using multicast group management protocols such as the Internet Group Management Protocol (IGMP). This requires the destination devices to know the multicast group address details of the stream that they wish to join.

In large networks, management of the group memberships and group addresses can be centralized into a control system, such as a routing control system, for example. The communication of detailed address information to the destination devices enables the destination devices to join the desired group. The communication of detailed address information to the destination devices requires development of specific drivers for each type of device, and there are many types of devices which may make this approach onerous. Some of these devices may not have useful Application Programming Interfaces (APIs) for a driver to target, or they have unfavorable side-effects when changing group memberships.

In an aspect, embodiments described herein provide a network control system or network switch that allows the destination device to listen on a fixed multicast group address (e.g. destination address). The network switch provides translation inside the network such that the desired stream is "translated" onto that destination address. In order to switch streams, the network control system may change or modify the translation steps inside the switch in order to remove the translation of the old stream and start translating the new stream onto the desired address. The destination device begins to receive the new stream without having taken any action, installing a specific driver, and so on. This allows implementation of router-like controls without having to develop specific driver modules for each of the downstream devices.

In an aspect, embodiments described herein provide the capability to take an original stream of packets, and forward them to multiple destinations within a network, while translating the header fields (network address translation) in a manner unique to each intended recipient.

Commercial off-the-shelf (COTS) Ethernet switches may have the capability to match to specific packet header details and perform the translation of header fields. However, this is done prior to the replication of the packets to multiple recipients. In recognition of this hardware pipeline limitation in COTS switches, embodiments described herein provide a network switch that utilizes re-entrant (loopback) connections to send packets back into the switching fabric for additional translation steps in order to specialize the packets per destination as needed. In some embodiments, industry-standard COTS switches may be used with the improved network controller instead of requiring bespoke hardware or software services.

In an aspect, embodiments described herein may provide a network switch or router configured to translate a header field of a packet in such a way that the packet is routed to fixed destination address(es) to which destinations devices are listening. As a simplified example, a network switch may receive packets P1 and P2 for transmission to destination addresses D1, D2 and D3 (which may be a unicast or multicast address). The destination devices or receivers may be referred to as R1, R2 and R3. In some scenarios the destination devices R1, R2 and R3 (or a subset thereof) may be listening to the same destination address, such as D1, for example. In other scenarios, each of the destination devices R1, R2 and R3 are listening to a unique pre-determined destination address D1, D2 and D3. For example, destination device R1 may be listening to destination address D1, destination device R2 may be listening to destination address D2, and destination device R3 may be listening to destination address D3. As each destination device R1, R2, and R3 may be listening to a specific (and typically distinct) destination address, there is a need within the network to replicate the original message (e.g. data packets), with each copy being distinctly addressed to a specific destination address.

For this illustrative example, each destination device R1/R2/R3 may be listening to a unique pre-determined destination address. For technical or practical reasons, it may be difficult to change the configuration of these addresses on the devices. For example, the device may not have a convenient interface for doing so or the details of the interface may not be readily apparent. Embodiments described herein may alter the destination address of the desired signal or packet within the network to match the already-programmed destination address for the intended destination device. If the destination address is a multicast group, then the destination device will typically "join" the group, though unicast destinations are also supportable by embodiments described herein. The embodiments described herein provide a simplification for unicast or multicast as there is no requirement for the control system (e.g. network controller) to communicate with the destination device R1/R2/R3 directly or update the device configuration etc.

In a multicast group scenario, hosts or destination devices may listen to a multicast group address in order to join a multicast group. A fixed multicast group address for the destination devices may be pre-programmed into the destination devices (e.g., during initial calibration or set-up before shipping to customers). A destination device may not need to be instructed to listen to a new multicast group address every time a new set of multicast packets need to be sent. All multicast packets (e.g. where a set of packets may be a video/audio stream) designated for destination devices may be directed to the fixed multicast group address by network switch and/or controller. This configuration may eliminate the need to send configuration updates to destination devices in order to have them receive alternate signals.

When a new packet arrives at a network switch (e.g. from a core network), addressing and translation (of a header field of the packet) may be performed at the network switch and the packet may then be sent to a destination address. The switch may be controlled by a network controller, for example. In some embodiments, the translation is done by way of re-entrant (loopback) connections to send packets (and replicated copies thereof) back into the switching fabric for additional translation steps. This may enable specialization of the packets per destination address or destination device as needed.

Typical switches inspect the packet header as it enters the switch, apply any header translations, and then replicate the packets to the intended destination interfaces. Embodiments described herein may replicate the incoming packet to a plurality of egress interfaces, each of which is "looped back" via re-entrant (loopback) connections (e.g. ports, cables) so that the replicated packet re-enters the switch. The switch may apply header translations to the packets upon re-entry. Accordingly, embodiments described herein may replicate or copy packets, loopback the replicated packets, perform translations on the replicated packets upon re-entry, replicate translated packets, loopback the replicated packets, and so on.

For example, the network switch may be configured with loop back cables or ports attached to interfaces which causes packets to egress the interface and immediately be received again through the interface. The interface may implement a header translation that rewrites the destination address in the replicated packet. The interface loop back and header translations implements the replication of the packets and translation of the replicated packets. There may be two interfaces for looping back packets to make copies or replications in parallel which are different from each other. In some examples, the switch may receive a packet (optionally translate), replicate the packet, (optionally transmit, loopback and receive again), translate the replicated packet and transmit the packet. The number of simultaneous replications and translations may be limited by the number of egress interfaces, loop back cables and ingress interfaces of the network switch. If more copies are required, then the network switch may implement a first translation and replication step to an intermediate address (destined for several loopback interfaces) and when those packets re-enter the switch, they can be each translated to a unique "second-level" intermediate address and replicated to one or more loopback ports, and then ultimately received, translated to individual final addresses, and sent to final destinations. If even more copies are required this process can be repeated several times, until eventually an implementation limit is reached.

The re-entrant (loopback) connections may be implemented in various ways. For example, some switches support an internal loop-back functionality as part of the configuration of the interface. While often intended for use as a testing feature, the internal loop-back functionality may be used to force egress traffic back into the switch in an operational setting. As another example, the interface could be fitted with an optical transceiver and further fitted for a fiber connection which connects the outgoing signal to the incoming receiver. As a further example, the interface may be fitted with a physical (electrical) loopback cable which connects the transmit connector pins to the receive connector pins. As another example, the interfaces could be considered in pairs, such that interface eth1 is connected (by optical or electrical connection) to interface eth2. In this case, the packets which egress eth1 would enter via eth2, and likewise the packets which egress eth2 would ingress on eth1.

The network controller may issue commands to the network switch for translation control. The translation steps on this secondary ingress (after the loopback) may include substitution of the destination IP address in the IP header with the specific intended destination. The translation steps may include substitution of the UDP destination port number to match the requirement. The translation steps may include substitution of the source IP address in the IP header. This may be required to properly support IGMPv3 Source-Specific Multicast operation in complex downstream networks, for example. The translation steps may include substitution of the destination MAC address in the Ethernet header with an appropriate (unicast or multicast) MAC address that corresponds to the new destination IP address. This may be the next-hop gateway in the cast of unicast IP through a gateway. The translation steps may include optional substitution of the UDP source port number. Depending on the nature of the switching fabric and the method used, the translation steps may also specify explicitly the final destination interface(s) for the message after the translation.

Embodiments described herein provide the capability to take an original stream of packets, and to forward them to multiple destinations within a network, while translating the header fields (e.g. network address translation) in a manner that may be unique to each intended recipient. The header field of a packet may be translated to route the packet to a fixed group destination A1. The translation of header field may be implemented so that it is unique to each intended recipient R1, R2 . . . based on the destination addresses.

The process may involve distributing the incoming signal (e.g. data packets) to enough interfaces to make the number of eventual copies that are required for the destination devices or recipients. If the original signal is already a multicast group, then normal multicast replication could be used in the switch to achieve this; however if the original signal is a unicast, then it may be required to translate the signal to an intermediate multicast address, which may be referenced for illustrative purposes as X1. For the purpose of clarity in this illustrative explanation, let us assume that in all cases, the original signal is translated to an intermediate address X1 prior to this replication function. Once the signal egresses the loopback ports, they may be translated on re-entry from address X1 into the final destination addresses (D1, D2, or D3) required. Embodiments may utilize re-entrant (loopback) connections to send packets back into the switching fabric for additional translation steps, in order to specialize the packets per destination as needed. The destination may be the final destination (e.g. devices R1, R2, or R3), or more specifically the IP destination address associated with device(s) R1, R2, or R3.

For example, a packet may be transmitted to a fixed multicast group address A1. Device R1 or R2 may receive the packet from A1 which may reference a router, for example, that further routes the packet P1 or P2 to the specific destination devices for all devices that are listening. This may be a two-step process. Original data may be translated to an intermediate address X1 and distributed to a plurality of "loopback" egress interfaces. When the traffic re-enters the switch via the loopback interface, it may be further translated (differently on each loopback ingress interface) to a new destination address (D1 for example) which corresponds to an eventual downstream receiver (R1 in this example case). In some examples, the router at the fixed address A1 may route the packet to each specific destination device based on the packet's header field. Network routers and switches may implement similar functionality.

FIG. 1 shows a schematic diagram of an example network architecture for address translation according to some embodiments. A network controller 50 connects to a switch 20 via core network 30 to trigger and/or control the replication, loopback and translation process on the incoming signal stream 24.

For simplicity only one network controller 50 and switch 20 are shown but system may include more devices. The network switch 20 (also called switching hub, bridging hub, bridge, router, and so on) is a computer networking device that connects devices together on a computer network, by using packet switching to receive, process and forward the signal stream 24 to the destination device.

The network controller 50 may include at least one processor, a data storage device (including volatile memory or non-volatile memory or other data storage elements or a combination thereof), and at least one communication interface. The network controller 50 components may be connected in various ways including directly coupled, indirectly coupled via a network, and distributed over a wide geographic area and connected via a network (which may be referred to as "cloud computing").

For example, and without limitation, the network controller 50 may be a server, network appliance, embedded device, computer expansion module, computer, mobile device, or other computing device capable of being configured to carry out the methods described herein.

Network 30 may be any network capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. WMAX), SS7 signaling network, fixed line, local area network, wide area network, and others, including any combination of these.

Data store 40 may be comprised of non-transitory computer-readable media storing various elements of information, such as user profiles, video information, network or data constraints, heuristic information, client requests, historical data, analytic data, event data, and so on. The information may be stored in various formats, such as flat files, database records, spreadsheets, etc. Data store 40 may be a relational database.

As an illustrative example, The incoming signal stream 24 comes into the switch 20 from the core network 30 via the receive (RCV) section (e.g. ingress interface) of the interface 22. The interface 22 also has a transmit (XMIT) section (e.g. egress interface) to transmit packets back to core network 30 and onto destination devices 12, 14, 16. The interface 22 may also be referenced as an ingress interface and a egress interface (or a pair of interfaces) for the receive and transmit sections. The switch 20 includes additional loopback connections implemented by translate (XLATE) sections and transmit sections of interfaces 26, 28, 32, 34, 36, 38, 42, 44. In this example, RCV references the hardware for receiving a packet. As noted, the receive function could be extended to include translation (e.g. XLATE) to an intermediate address. XMIT references the hardware for transmitting a packet. As shown, the interfaces 26, 28, 32, 34, 36, 38, 42, 44 of the switch 20 includes a receive section (with translation capability) and a transmit section. XLATE is also a receive section, but so named to indicate that header translation (as described in point 4 above) is a critical element of the function within this hardware implementation and process. The destination address "loopback" is achieved by header field translation using the XLATE sections of the switch 20. The ultimate destination addresses are inserted by the header translation logic associated with the ingress side of the loopback port. The RCV unit of interface 22 receives packets (from core network 30) and matches them against one or more entries in a table (stored by local memory or data store 40). The matching entry indicates which of the various XMIT sections the packet should be forwarded to after replication. As noted this matching register may also specify translation of address fields in the matched packet prior to replication. The coloured lines emanating from the RCV block indicate by illustrative example the replication patterns of two different matching rows, corresponding to two different packet flows. This process may be applied to many different packet flows at the same time, up to the limits of the underlying switch 20 hardware and software.

As an illustrative example, the process implemented by switch 20 and triggered or controlled by network controller 50 starts with packets P1 received by switch 20 at port or interface 22. To add or update a new destination (e.g. destination device D1 12, destination device D2 14, destination device D3 16) the switch 20 checks for the existing map to the destination and removes the existing map. The switch 20 selects the new XMIT section or port not already in use for P1. The network controller 50 configures the XLATE section (paired with the XMIT section) for the required translation. After replication and translation via loopback, the switch 20 routes the translated packet P1 back to the core network 30. To remove an existing map, the network controller 50 modifies the matching entry on RCV interface 22 to stop forwarding the matching packets to the related XMIT section, and removes the related the XLATE mapping. The switch 20 also finds and removes the route from the XLATE unit via XMIT unit of interface 22 back to the core network 30.

The network switch 20 has a switching fabric provided by interfaces 22, 26, 28, 32, 34, 36, 38, 42, 44. The network switch 20 has loopback connections for the translation. The loopback connections may be implemented by internal loop back functionality as part of a configuration interface that may force traffic back into the network switch in an operational setting. The loopback connections may be implemented by an optical receiver and a fiber connection. The loopback connections may be implemented by a physical electrical loopback cables that connects a transmit connector pins to receive connector pins, the transmit connector pins forming part of the at least one egress interface, and the receive connector pins forming part of the at least one ingress interface. The loopback connections may be implemented by a pair of interfaces having a first interface and a second interface (which may also be referred to as an interface having a receive section and transmit section). The first interface may be connected to the second interface using an electrical or optical connection, where packets that egress on the first interface then ingress on the second interface and packets that egress on the second interface then ingress on the first interface.

The network switch 20 may translate the header address information of the respective replicated signal packet to the destination address by substitution of a destination IP address in a IP header with the destination address. The network switch 20 may translate the header address information of the respective replicated signal packet to the destination address by substitution of a destination MAC address in an Ethernet header with a unicast or multicast MAC address that corresponds to the destination address or next hop gateway to the destination address. The network switch 20 may specify a final destination interface corresponding to the destination device.

Figure 2:
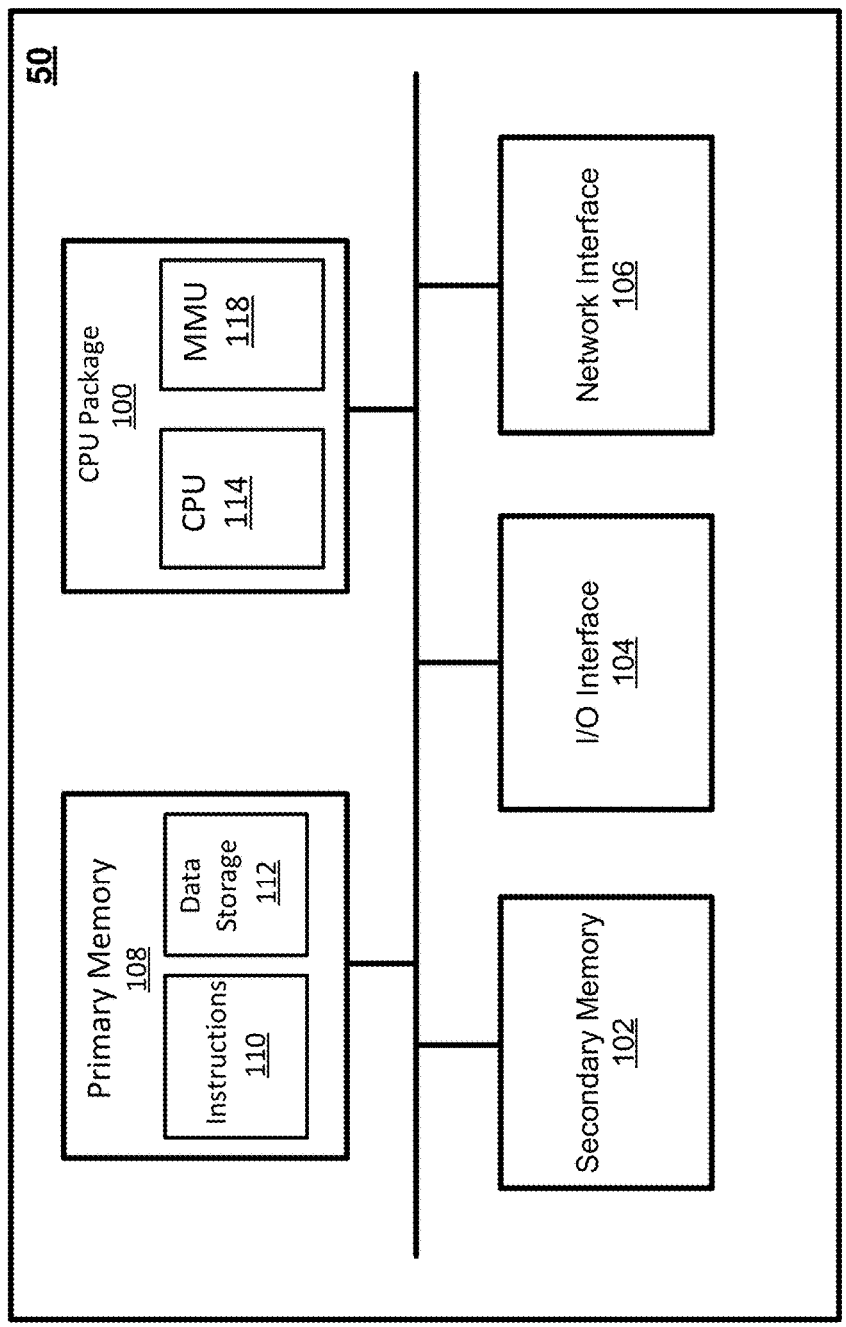
FIG. 2 shows a schematic diagram of a computing device that may be used to implement a network controller according to some embodiments.

FIG. 2 shows a schematic diagram of a computing device that may be used to implement a network controller 50 according to some embodiments. The network controller 50 provides multicast packet distribution by controlling a network switch.

As depicted, network controller 50 may include at least one CPU package 100, primary memory 108, secondary memory 102, at least one I/O interface 104, and at least one network interface 106. CPU package 100 may include at least one processor or CPU 114 and at least one Memory Management Unit (MMU) 118. Each CPU 114 may be, for example, any type of general-purpose microprocessor or microcontroller, a digital signal processing (DSP) processor, an integrated circuit, a field programmable gate array (FPGA), a reconfigurable processor, or any combination thereof. The CPU 114 may be configured to execute instructions 110 to implement a process to control switch 20 for replication and translation as described herein. The CPU 114 may be configured to generate a control command using an application programming interface for the network switch. The control command has a replicate command to replicate the incoming signal packets by distributing the incoming signal packets based on the number of destination addresses (e.g. for the multicast or unicast) to a corresponding number of egress interfaces of the network switch. The egress interfaces having loopback connections to ingress interfaces of the network switch. The control command has a header translation command to control the network switch to translate header address information of each of the replicated signal packets to a destination address of the plurality of destination addresses. The destination address for transmission of the translated replicated signal packets to a destination device listening to the destination address. The control command may have an intermediate translation command to control the network switch to translate the header address information of the incoming signal packets to an intermediate address. In response to receiving the control command and prior to the distributing the incoming signal packets, the network switch translates the header address information to the intermediate address, and for each of the replicated signal packets, translates the intermediate address of the respective replicated signal packet to the destination address.

MMU 118 may be a hardware unit, or a unit comprising both hardware and software. In one embodiment, CPU 114 may call upon MMU 118 to access a physical block on a storage device for the purpose of scanning, writing, copying, or erasing digital data from the physical block. For example, MMU 118 may be configured to translate virtual memory address to physical addresses, and vice versa, on storage devices such as primary memory 108 or secondary memory 102. In some cases, MMU 118 may be configured to handle the moving of information between primary memory 108 and secondary memory 102. In one embodiment, MMU 118 may be installed separately from CPU package 100. Primary memory 108, also known as RAM, may include a first storage portion 110 that stores program instructions and a second storage portion 112 that stores other types of data. Primary memory 108 may be directly accessible to the CPU package 100 by means of a memory bus (not shown).

Secondary memory 102, also known as auxiliary memory, may be one or more non-volatile memory devices such as flash memory, optical discs, magnetic discs and magnetic tape. In one embodiment, primary memory 108 and secondary memory 102 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

The primary memory 108 and secondary memory 102 may provide a data storage device storing a plurality of destination addresses used for the translations. A destination address may correspond to a multicast group address or a unicast address. destination address may correspond to an IP address associated with the destination device.

Each I/O interface 104 enables network controller 50 to interconnect with one or more input devices, switches 20, and so on.

Each network interface 106 enables network controller 50 to communicate with other components, to exchange data with other components, to access and connect to network resources, to serve applications, and perform other computing applications by connecting to a network (or multiple networks) capable of carrying data, e.g., one more networks 30. The network interface 106 or I/O interface 104 may include transceiver to receive the plurality of destination addresses and send the control command to the network switch to trigger the distribution of the incoming signal packets to the plurality of destination addresses.

Figure 3:
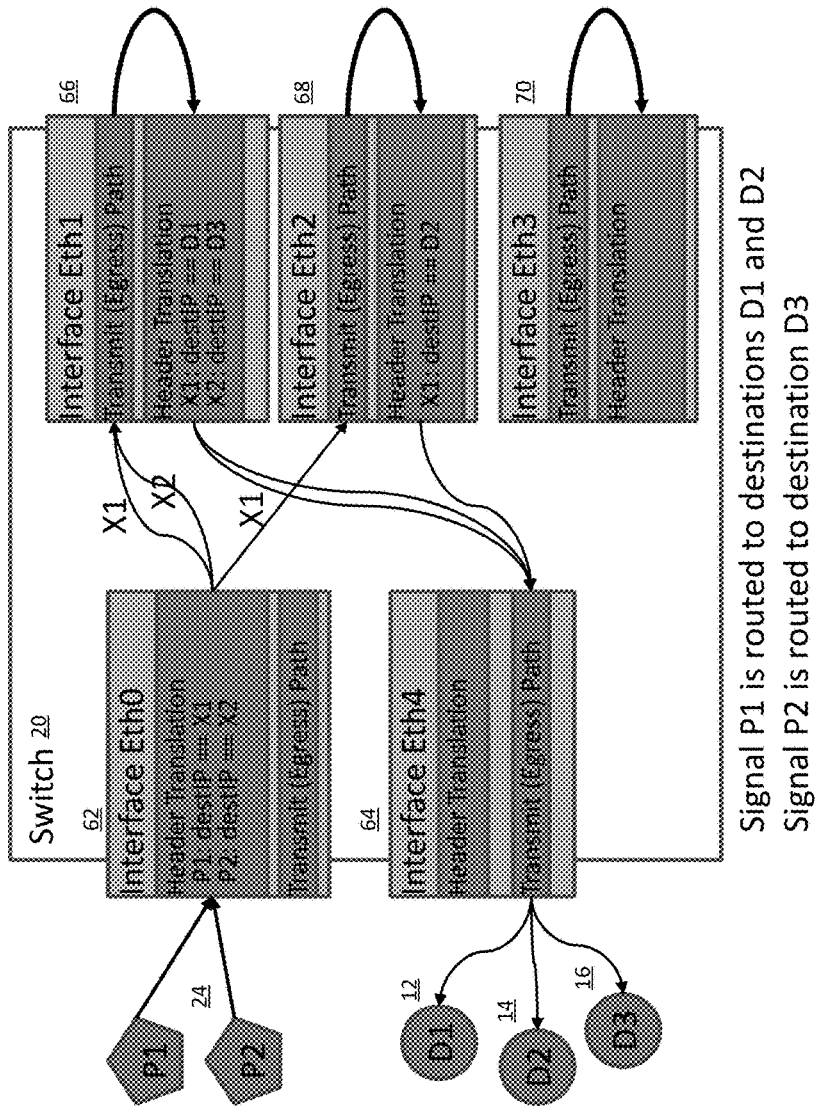
FIG. 3 shows an exemplary switch architecture according to some embodiments.

FIG. 3 shows an exemplary network switch 20 architecture according to some embodiments. As noted, the switch 20 receives a control command from a network controller to implement the translation and distribution operations. The network switch 20 receives packets 24 (P1, P2) at the receive path (or ingress interface) of the interface Eth0 62 configured (via control command) with header translation. The example header translation causes the P1 destination address to be over written as X1 and the P2 destination address to be over written as X2. This may be an example intermediate header translation. The destination addresses and header translations may also be configured by the control command. For translated header address X1, the interface Eth0 62 has a forwarding path to interface Eth1 66 and interface Eth2 68. This shows an example replication of packet P1 (after translation to X1). The term "forwarding path" may describe the internal flow of packets as compared to external actions to or from outside the switch 20. For translated header address X2, the interface Eth0 62 has a forwarding path to interface Eth1 66. The loop back cable attached to interface Eth1 66 causes the packets which egress this interface to be immediately received again through interface Eth1 66, which has a header translation that re-writes X1 to have destination address D1 and X2 to have destination address D3. After this translation process, the interface Eth1 66 has a forwarding path to interface Eth4 for transmission of (now specifically translated versions of) original packets P1 and P2 to destination address D1 12 and to destination address D3 16. The loop back cable attached to interface Eth2 68 causes the packets which egress this interface to be immediately received again through interface Eth2 68, which has a header translation that re-writes X1 to have destination address D2. After this translation process, the interface Eth2 68 has a forwarding path to interface Eth4 for transmission of (now specifically translated versions of) packet P1 to destination address D2 14. The interfaces 66, 68, 70 have loop back connections for the translation operations. Accordingly, packet P1 is routed to destination address D1 12, D2 14 and packet P2 is routed to destination address D3 16.

Figure 4:
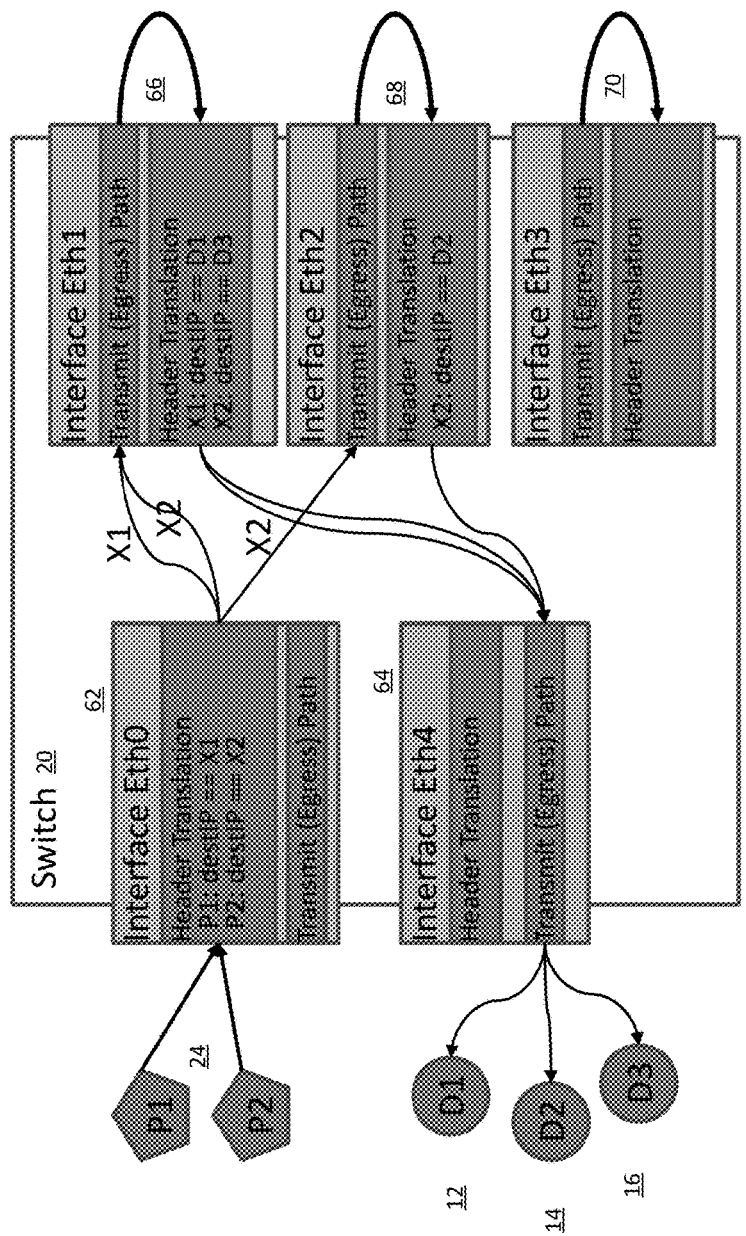
FIG. 4 shows another exemplary switch architecture according to some embodiments.

FIG. 4 shows another exemplary switch 20 architecture according to some embodiments. The switch 20 is similar to that of FIG. 4 except that one forwarding entry at eth0 is changed, and one translation instruction at eth1 is changed. As noted, the switch 20 receives a control command from a network controller to implement the translation and distribution operations. The network switch 20 receives packets 24 (P1, P2) at the receive path (or ingress interface) of the interface Eth0 62 configured (via control command) with header translation. The example header translation causes the P1 destination address to be over written with X1 and P2 destination address to be over written as X2. This may be an example intermediate header translation. The destination addresses and header translations may also be configured by the control command. For translated header address X1, the interface Eth0 62 has a forwarding path to interface Eth1 66. For translated header address X2, the interface Eth0 62 has a forwarding path to interface Eth1 66 and interface Eth2 68. This shows an example replication of packet P2. The loopback cable attached to interface Eth1 66 causes the packets which egress this interface to be immediately received again through interface Eth1 66, which has a header translation that re-writes X1 to have destination address D1 and X2 to have destination address D3. After this translation process, the interface Eth1 66 has a forwarding path to interface Eth4 64 for transmission of (now specifically translated versions of) original packets P1 and P2 to destination address D1 12 and to destination address D3 16. The loop back cable attached to interface Eth2 68 causes the packets which egress this interface to be immediately received again through interface Eth2 68, which has a header translation that re-writes X2 to have destination address D2. After the translation process, the interface Eth2 68 has a forwarding path to interface Eth4 for transmission of (now specifically translated versions of) packet P2 to destination address D2 14. The interfaces 66, 68, 70 have loop back connections for the translation operations. Accordingly, packet P1 is routed to destination address D1 12 and packet P2 is routed to destination address D2 14 and D3 16.

Figure 5:
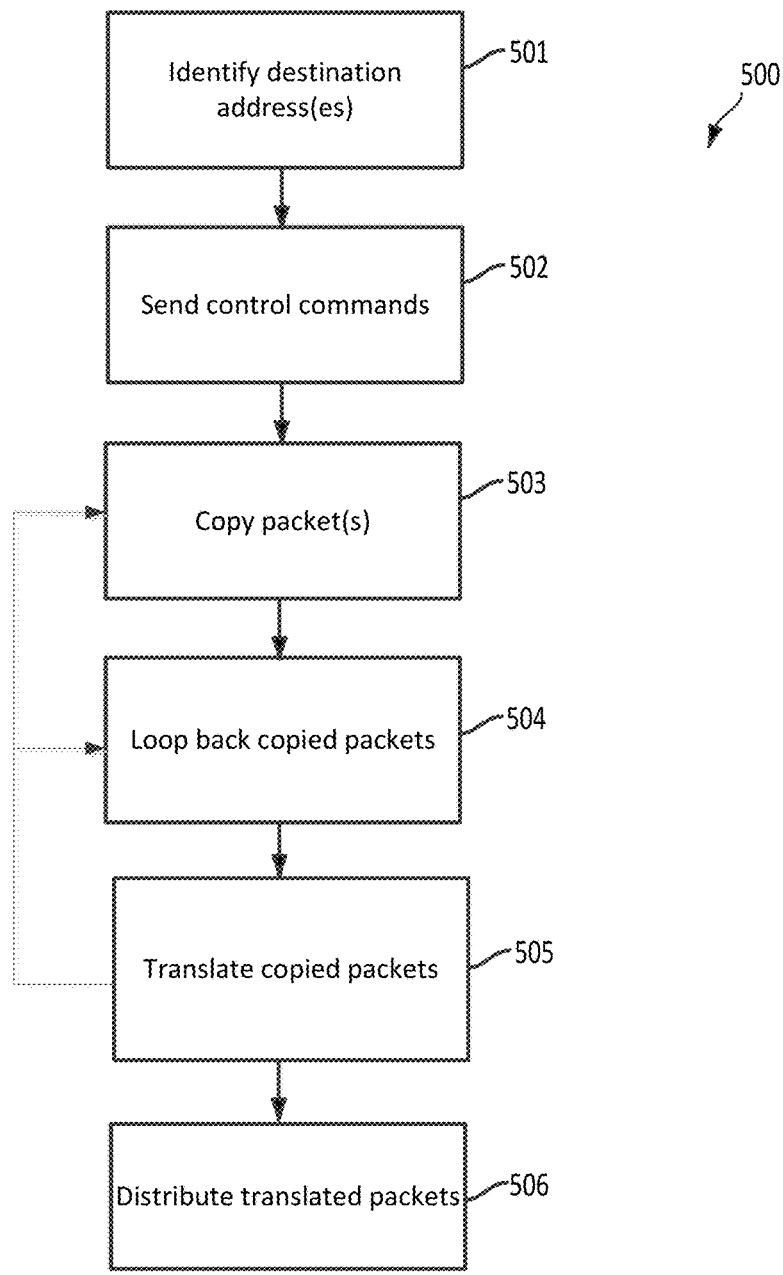
FIG. 5 illustrate a method of network-based address translation according to some embodiments.

FIG. 5 illustrate a method of network-based address translation according to some embodiments.

This process allows the destination device to set to listen on a fixed multicast group address, and then provides translation inside the network such that the desired stream is "translated" onto that destination address. In order to switch streams, the network control system will change the translation steps inside the switch in order to remove the translation of the old stream and start translating the new stream onto the desired address. The destination device begins to receive the new stream without having taken any action to do so.

At step 501, the network controller 50 identifies destination addresses for translating incoming signal packets received at an ingress interface of the network switch 20. The destination address and desired address may refer to the fixed multicast group address but it is not required. This process can also deal with unicast-addressed destinations.

At step 502, the network controller 50 generates a control command using an application programming interface for the network switch for distribution of the incoming signal packets to the plurality of destination addresses. The control command has a replicate command to replicate the incoming signal packets by distributing the incoming signal packets based on a number destination addresses to a corresponding number of egress interfaces or forwarding paths of the network switch. As noted, an egress interface or forwarding path may have a loopback connection to an ingress interface of the network switch. The control command has a header translation command to control the network switch 20 to translate header address information of each of the replicated signal packets to a destination address, the destination address for transmission of the translated replicated signal packets to a destination device listening to the destination address. The control commands is used by the controller 50 to control the network switch 20. The network controller 50 sends the control command to the network switch over the core network to trigger the distribution of the incoming signal packets to the plurality of destination addresses.

At 503, the network switch 20 replicates or copies the incoming signal packets by distributing the incoming signal packets based on a number of the destination addresses to a corresponding number of egress interfaces.

At 504, the network switch 20 receives the replicated incoming signal packets from the loopback connections at the corresponding interfaces.

At 505, for each of the replicated signal packets, the network switch 20 translates the header address information of the respective replicated signal packet to a destination address.

For example, the switch receives control commands generated at 502 by the network controller 50. The network switch 20 receives packets at its receive path or ingress interface configured by the control commands for header translation. The header translation may cause the destination address of packet to be overwritten as an example of intermediate translation. The destination addresses and header translations may also be configured by the control commands. For the translated header address of the packet, the interface may have a forwarding path to itself or another interface of network switch 20. This is an example of replication at 503. A loopback cable or other connection mechanism attached to the interface causes the packets which egress the interface to be immediately received again through the same or another interface with a header translation that re-writes the destination address of the replicated packet. This is an example of loop back at 504 and translation at 505. After translation, an interface of network switch 20 has a forwarding path to egress interface of network switch 20 for transmission of the now specifically translated versions of packet.

At 506, the network switch 20 transmits the translated replicated signal packet to the destination address, the destination device listening to the destination address.

This may implement router-like controls within a plant without having to develop specific driver modules for each of the downstream devices. A plant may be an expression within the television industry to refer to the collected operational environment within the facility.

The modified packets may be passed out the same interface which brought in the original packets. At least two interfaces may be used for looping back packets and making copies in parallel which are different from each other. The process may involve, for the packets, receive (optionally translate) replicate, (transmit, loop-back, and receive again) translate, and transmit. The number of simultaneous replications may be limited by the number of egress/loopback/ingress interfaces. If more copies are required, then a "first" translation and replication step can be done to an intermediate address (destined for several loopback interfaces) and when those packets re-enter, they can be each translated to a unique "second-level" intermediate address and replicated to one or more loopback ports, and then ultimately received, translated to individual final addresses, and sent to final destinations. If even more copies are required this process can be repeated several times, until eventually some implementation limit is reached.

In principle, the modified packets may be passed out the same interface which brought in the original packets. However, there may be at least two interfaces for looping back packets, in order to make copies in parallel which are different from each other. The operations may include receive (optionally translate) replicate, (transmit, loop-back, and receive again) translate, and transmit. The number of simultaneous replications may be limited by the number of egress/loopback/ingress interfaces. If more copies are required, then a "first" translation and replication step can be done to an intermediate address (destined for several loopback interfaces) and when those packets re-enter, they can be each translated to a unique "second-level" intermediate address and replicated to one or more loopback ports, and then ultimately received, translated to individual final addresses, and sent to final destinations. If even more copies are required this process can be repeated several times, until eventually some implementation limit is reached.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The following discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only. The scope is indicated by the appended claims.

What is claimed is:

1. A process for packet distribution by controlling a network switch having a plurality of ingress interfaces and a plurality of egress interfaces, the process comprising:
   identifying a plurality of destination addresses for translating incoming signal packets received at an ingress interface of the plurality of ingress interfaces of the network switch;
   generating a control command using an application programming interface for the network switch for distribution of the incoming signal packets to the plurality of destination addresses, the control command having a replicate command to replicate the incoming signal packets by distributing the incoming signal packets based on a number of the plurality of destination addresses to a corresponding number of egress interfaces of the plurality of egress interfaces of the network switch, each of the corresponding number of egress interfaces having a forwarding path and a loopback connection to an ingress interface of the plurality of ingress interfaces of the network switch, the control command having a header translation command to control the network switch to translate header address information of each of the replicated signal packets to a destination address of the plurality of destination addresses, the destination address for transmission of the translated replicated signal packets to a destination device listening to the destination address; and
   sending the control command to the network switch over the core network to trigger the distribution of the incoming signal packets to the plurality of destination addresses.

2. The process of claim 1, further comprising generating the control command having an intermediate translation command to control the network switch to translate the header address information of the incoming signal packets to an intermediate address prior to the replicate command distributing the incoming signal packets.

3. The process of claim 1, further comprising identifying the plurality of destination addresses for translating the incoming signal packets by checking the incoming signal packets for specific header address information.

4. The process of claim 3, wherein the specific header address information comprises at least one of: Ethernet or Internet Protocol (IP) header fields, and User Datagram Protocol (UDP) source or destination port numbers.

5. The process of claim 1, further comprising
   replicating the incoming signal packets by distributing the incoming signal packets based on the number of the plurality of destination addresses to the corresponding number of egress interfaces of the plurality of egress interfaces of the network switch;
   receiving the replicated incoming signal packets from the loopback connections at the corresponding ingress interfaces of the network switch; and
   for each of the replicated signal packets, translating the header address information of the respective replicated signal packet to a destination address of the plurality of destination addresses, and transmitting the translated replicated signal packet to the destination address, the destination device listening to the destination address.

6. A computer network system for multicast packet distribution comprising:
   a network switch having a plurality of ingress interfaces, a plurality of egress interfaces, and a switching fabric, at least one of the plurality of egress interfaces having a loopback connection to at least one of the plurality of ingress interfaces to the switching fabric; and
   a network controller connected to the network switch via a core network, the network controller configured to send a control command using an application programming interface for the network switch, the control command having a replicate command to replicate the incoming signal packets by distributing the incoming signal packets based on a number of a plurality of destination addresses to a corresponding number of egress interfaces of the plurality of egress interfaces of the network switch, each of the corresponding number of egress interfaces having a loopback connection to an ingress interface of the plurality of ingress interfaces of the network switch, the control command having a header translation command to control the network switch to translate header address information of each of the replicated signal packets to a destination address of the plurality of destination addresses, the destination address for transmission of the translated replicated signal packets to a destination device listening to the destination address,
   in response to receiving the control command, the network switch replicates the incoming signal packets by distributing the incoming signal packets based on the number of the plurality of destination addresses to the corresponding number of egress interfaces of the plurality of egress interfaces, receives the replicated incoming signal packets from the loopback connections at the corresponding ingress interfaces, and for each of the replicated signal packets, translates the header address information of the respective replicated signal packet to the destination address of the plurality of destination addresses, and transmits the translated replicated signal packet to the destination address, the destination device listening to the destination address.

7. The system of claim 6, wherein a destination address of the plurality of destination addresses corresponds to a multicast group address.

8. The system of claim 6, wherein a destination address of the plurality of destination addresses corresponds to a unicast address.

9. The system of claim 6, wherein a destination address of the plurality of destination addresses corresponds to an IP address associated with the destination device.

10. The system of claim 6, wherein the network controller sends the control command having an intermediate translation command to control the network switch to translate the header address information of the incoming signal packets to an intermediate address, and in response to receiving the control command and prior to the distributing the incoming signal packets, the network switch translates the header address information to the intermediate address, and for each of the replicated signal packets, translates the intermediate address of the respective replicated signal packet to the destination address.

11. The system of claim 6, wherein at least one of the loopback connections is implemented by internal loop back functionality as part of a configuration interface that may force traffic back into the network switch in an operational setting.

12. The system of claim 6, wherein at least one of the loopback connections is implemented by an optical receiver and a fiber connection.

13. The system of claim 6, wherein at least one of the loopback connections is implemented by a physical electrical loopback cables that connects a transmit connector pins to receive connector pins, the transmit connector pins forming part of the plurality of egress interfaces, and the receive connector pins forming part of the plurality of ingress interfaces.

14. The system of claim 6, wherein at least one of the loopback connections is implemented by a pair of interfaces, of the plurality of egress interfaces and the plurality of ingress interfaces, the pair of interfaces having a first interface and a second interface, the first interface being connected to the second interface using an electrical or optical connection, where packets that egress on the first interface then ingress on the second interface and packets that egress on the second interface then ingress on the first interface.

15. The system of claim 6, wherein the network switch translates the header address information of the respective replicated signal packet to the destination address by substitution of a destination IP address in a IP header with the destination address.

16. The system of claim 6, wherein the network switch translates the header address information of the respective replicated signal packet to the destination address by substitution of a destination Media Access Control (MAC) address in an Ethernet header with a unicast or multicast MAC address that corresponds to the destination address or next hop gateway to the destination address.

17. The system of claim 6, wherein after translation, the network switch specifies a final destination interface corresponding to the destination device.

18. A network controller for multicast packet distribution by controlling a network switch having a plurality of ingress interfaces and a plurality of egress interfaces, the controller comprising:
 a data storage device storing a plurality of destination addresses;
 a processor to generate a control command using an application programming interface for the network switch, the control command having a replicate command to replicate the incoming signal packets by distributing the incoming signal packets based on a number of the plurality of destination addresses to a corresponding number of egress interfaces of the plurality of egress interfaces of the network switch, each of the corresponding number of egress interfaces having a loopback connection to an ingress interface of the plurality of ingress interfaces of the network switch, the control command having a header translation command to control the network switch to translate header address information of each of the replicated signal packets to a destination address of the plurality of destination addresses, the destination address for transmission of the translated replicated signal packets to a destination device listening to the destination address; and
 a transceiver to receive the plurality of destination addresses and send the control command to the network switch to trigger the distribution of the incoming signal packets to the plurality of destination addresses.

19. The network controller of claim 18, wherein the command has an intermediate translation command to control the network switch to translate the header address information of the incoming signal packets to an intermediate address prior to the replicate command distributing the incoming signal packets.

20. A computer network switch comprising:
 a plurality of ingress interfaces for receiving incoming signal packets, each packet having a header field;
 a plurality of egress interfaces;
 a switching fabric with at least one of the plurality of egress interfaces having a loopback connection to at least one of the plurality of ingress interfaces;
 wherein in response to receiving a control command generated using an application programming interface for the network switch, the control command having a replicate command to replicate the incoming signal packets by distributing the incoming signal packets based on a number of a plurality of destination addresses to a corresponding number of egress interfaces of the plurality of egress interfaces of the network switch, each of the corresponding number of egress interfaces having a loopback connection to an ingress interface of the plurality of ingress interfaces of the network switch, the control command having a header translation command to control the network switch to translate header address information of each of the replicated signal packets to a destination address of the plurality of destination addresses, the destination address for transmission of the translated replicated signal packets to a destination device listening to the destination address, the network switch replicates the incoming signal packets by distributing the incoming signal packets based on the number of the plurality of destination addresses to the corresponding number of egress interfaces of the plurality of egress interfaces, receives the replicated incoming signal packets from the loopback connections at the corresponding ingress interfaces, and for each of the replicated signal packets, translates the header address information of the respective replicated signal packet to the destination address of the plurality of destination addresses, and transmits the translated replicated signal packet to the destination address, the destination device listening to the destination address.

21. The switch of claim 20, wherein at least one of the loopback connections is implemented by internal loop back functionality as part of a configuration interface that may force traffic back into the network switch in an operational setting.

22. The switch of claim 20, wherein at least one of the loopback connections is implemented by an optical receiver and a fiber connection.

23. The switch of claim 20, wherein at least one of the loopback connections is implemented by a physical electrical loopback cables that connects a transmit connector pins to receive connector pins, the transmit connector pins forming part of the plurality of egress interfaces, and the receive connector pins forming part of the plurality of ingress interfaces.

24. The switch of claim 20, wherein at least one of the loopback connections is implemented by a pair of interfaces, of the plurality of egress interfaces and the plurality of ingress interfaces, the pair of interfaces having a first interface and a second interface, the first interface being connected to the second interface using an electrical or optical connection, where packets that egress on the first interface then ingress on the second interface and packets that egress on the second interface then ingress on the first interface.

* * * * *